United States Patent
Lambert

(10) Patent No.: US 8,671,451 B1
(45) Date of Patent: Mar. 11, 2014

(54) METHOD AND APPARATUS FOR PREVENTING MISUSE OF A GROUP KEY IN A WIRELESS NETWORK

(75) Inventor: Paul A. Lambert, Mountain View, CA (US)

(73) Assignee: Marvell International Ltd. (BM)

( * ) Notice: Subject to any disclaimer, the term of this patent is extended or adjusted under 35 U.S.C. 154(b) by 72 days.

(21) Appl. No.: 13/180,999

(22) Filed: Jul. 12, 2011

Related U.S. Application Data

(60) Provisional application No. 61/370,650, filed on Aug. 4, 2010.

(51) Int. Cl.
*G06F 11/00* (2006.01)

(52) U.S. Cl.
USPC .......................................... 726/25; 380/270

(58) Field of Classification Search
USPC ........ 726/23, 25; 713/151, 160; 380/270, 277
See application file for complete search history.

(56) References Cited

U.S. PATENT DOCUMENTS

| | | | | |
|---|---|---|---|---|
| 7,293,289 B1* | 11/2007 | Loc et al. | ......................... | 726/23 |
| 8,151,351 B1* | 4/2012 | Loc et al. | ........................ | 726/23 |
| 2008/0043686 A1* | 2/2008 | Sperti et al. | .................... | 370/338 |
| 2010/0332822 A1* | 12/2010 | Liu et al. | ....................... | 713/151 |
| 2012/0163182 A1* | 6/2012 | Dade et al. | .................... | 370/241 |

OTHER PUBLICATIONS

MD Sohail Ahmad, AirTight Networks WPA TOO!, submitted in Defcon 18 2010 (7 pgs).
MD Sohail Ahmad, AirTight Networks WPA TOO!, submitted in Defcon 182010 (32 pgs).
IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, IEEE Std 802.11-2007 (pp. 196-197).
Airtight Networks: White Paper entitled "WPA2 Hole 196 Vulnerability: Exploits and Remediation Strategies", 2010 (pp. 1-7).

* cited by examiner

*Primary Examiner* — Samson Lemma

(57) ABSTRACT

Systems, methods, and other embodiments associated with preventing misuse of group keys in a wireless network are described. According to one embodiment, an apparatus is configured to determine a packet type for a packet and determine a key type for the packet. The packet is analyzed based, at least in part, on the packet type and the key type to detect a security risk.

20 Claims, 4 Drawing Sheets

METHOD AND APPARATUS FOR PREVENTING MISUSE OF A GROUP KEY IN A WIRELESS NETWORK

CROSS REFERENCE TO RELATED APPLICATIONS

This present disclosure claims the benefit of U.S. provisional application Ser. No. 61/370,650, filed on Aug. 4, 2010, which is incorporated herein by reference.

BACKGROUND

Wireless communications in a computer network present many security difficulties. Communications between a wireless Access Point (AP) and wireless client devices are vulnerable to eavesdropping and attacks by malicious users. To provide security against these threats, a wireless Access Point typically encrypts the wireless communications. Accordingly, when sending broadcast and multicast messages, a wireless Access Point uses a key that is shared with all wireless clients. When sending and receiving individual client communications, a wireless Access Point uses client-specific private keys.

However, using encryption to secure a wireless network is not without vulnerabilities. Protocols that define how a wireless access point and clients interact are continuously evolving and are often flawed. Many networks use specialized devices to monitor for security attacks on wired and wireless connections but these devices are limited to detecting communications sent through the network. Wireless communications from an attacker sent directly to a client device can avoid detection by these devices and compromise the client device. In this way, an entire network security scheme can be compromised.

SUMMARY

In one embodiment, a device includes a wireless receiver that receives wireless communications including encrypted packets. The device further includes an address logic configured to inspect at least one encrypted packet for a packet type by determining whether the encrypted packet is addressed to an individual device or a group of devices. The device also includes a security logic configured to determine a type of key used to encrypt the encrypted packet. The security logic may also be configured to detect whether the encrypted packet corresponds to a security risk based, at least in part, on the key type and the packet type.

In another embodiment, a non-transitory computer-readable medium includes computer-executable instructions for determining whether an encrypted packet received by a wireless device corresponds to a security risk. The computer-executable instructions are executable by a computer to cause the computer to determine a type of the encrypted packet. The computer-executable instructions also cause the computer to determine a type of key used to encrypt the encrypted packet and to detect whether the encrypted packet corresponds to the security risk based, at least in part, on the type of the encrypted packet and the type of key used to encrypt the encrypted packet.

In another embodiment, a method includes inspecting a packet received on a wireless connection in a client device to retrieve a packet type identifier of the packet and a key type identifier for a key used to encrypt the packet. The method also includes analyzing the packet type identifier of the packet and the key type identifier based, at least in part, on a policy. The method further includes generating a signal in response to determining that the packet type identifier and the key type identifier match a condition of the policy that indicates a security risk.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one example of the boundaries. In some examples one element may be designed as multiple elements or that multiple elements may be designed as one element, also in some examples, an element shown as an internal component of another element may be implemented as an external component and vice versa. Furthermore, elements may not be drawn to scale.

DETAILED DESCRIPTION

Described herein are example systems, methods, and other embodiments associated with preventing misuse of a group cryptographic key in a wireless network.

Defects in security standards for wireless communications are one source that malicious users exploit to inappropriately access a network. One example of this type of a defect is "Hole 196" in the IEEE 802.11-2007 standard. Hole 196 is a weakness in the IEEE 802.11-2007 standard that provides an opportunity for a member device of a wireless network to launch malicious attacks against other member devices in the network.

Members of an 802.11 wireless network that is secured using Robust Security Network Associations (RSNA) share a Group Temporal Key (GTK) with an authenticating wireless access point. The authenticating wireless access point uses the GTK to encrypt broadcast and multicast packets sent to member devices.

Hole 196 allows a member device to use the GTK to encrypt a packet and send the encrypted packet directly to one or more other member devices. By sending packets encrypted with the GTK to other member devices, the malicious member device can inject erroneous Address Resolution Protocol (ARP) packets and other malicious packets into the network as though the packets were sent from the wireless access point. In one embodiment, a device prevents misuse of the GTK by discarding received packets that are unicast packets encrypted with the GTK.

Figure 1:
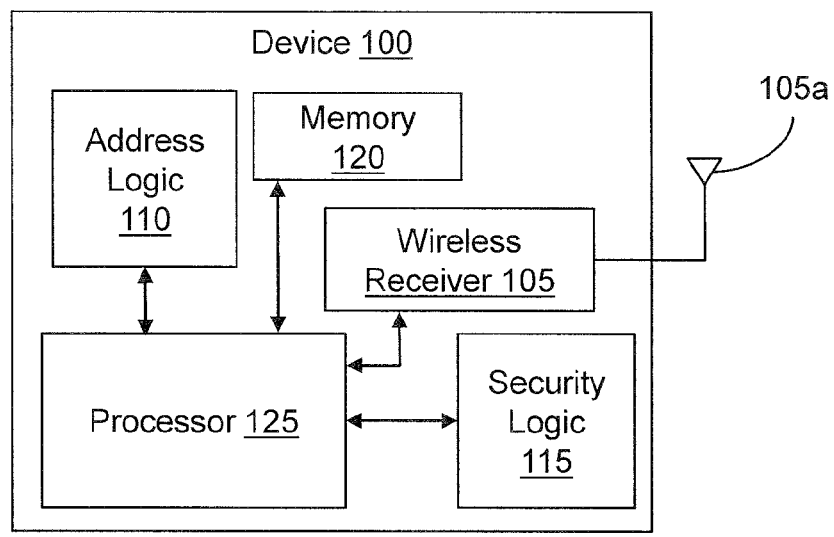
FIG. 1 illustrates one embodiment of a device associated with preventing misuse of a group cryptographic key in a wireless network.

With reference to FIG. 1, one embodiment of a device 100 is shown that is associated with preventing misuse of a group cryptographic key in a wireless network. The device 100 includes a wireless receiver 105 that is configured to receive communications over a wireless network via an antenna 105a (which may be internal and/or part of a chip). The device 100 also includes address logic 110 and security logic 115. In one embodiment, the device 100 also includes a memory 120 and a processor 125.

In one embodiment, the device 100 is implemented on a chip including one or more integrated circuits configured to perform one or more of the functions described herein. The device 100 may be implemented in a network interface card (NIC) that includes a wireless transmitter and the wireless receiver 105 that are configured to send and receive communications over a wireless network. In other embodiments, device 100 may be implemented as an embedded chip, as a non-transitory computer-readable medium, and so on. In certain embodiments, device 100 is operably connected to a host system to provide wireless communications to the host system. In such an embodiment, processor 125 and memory 120 may be part of the host system and not the device 100.

In one embodiment, the device 100 is a wireless client device that is in communication with a wireless access point. A plurality of wireless devices may be connected to the wireless access point to form a Local Area Network (LAN). In one embodiment, the wireless access point provides access to a network (e.g., a LAN, a Wireless LAN (WLAN), a Wide Area Network (WAN), the Internet, and so on).

When connected to a network, the wireless receiver 105 receives wireless communications (e.g., in the form of packets) sent to the device 100. The packets may be addressed directly to the device 100 (e.g., unicast packets) or to a group of devices that includes the device 100 (e.g., multicast packets). In one embodiment, the packets are Media Access Control (MAC) Protocol Data Unit (MPDU) packets that are compatible with a wireless communication standard (e.g., IEEE 802.11-2007 standard, or other IEEE standard).

When packets are received, the address logic 110 and security logic 115 perform a combination of checks to determine whether the packets may be malicious (e.g., violates a security policy/rule). In one embodiment, address logic 110 inspects the packets received at the device 100 to determine a type of the packet (also referred to herein as "packet type"). To determine the packet type, the address logic 110 inspects the destination address and determines whether the packet is addressed to only the device 100 or to a group of devices that includes the device 100. To determine if the packet is addressed to only the device or to a group of devices, in one embodiment, the address logic 110 checks a destination MAC address in a MAC header of the packet.

Broadcast and multicast packets are packets intended for a group of devices. If the packet is a broadcast or multicast packet, the Least Significant Bit (LSB) in the first octet of the destination MAC address of the MAC header will be set to "1" according to IEEE 802.11.

A unicast packet is a packet intended for an individual device. If the packet is a unicast packet then the LSB in the first octet of the destination MAC address of the MAC header will be set to "0" according to IEEE 802.11. By inspecting this bit, the address logic 110 can determine if the packet is addressed to a single client device (e.g. the device 100) or a group of devices.

The security logic 115 is configured to determine a type of key (also referred to herein as "key type") used to encrypt the packet. The key may be a private key used by the access point to encrypt packets addressed to an individual device. Alternatively, the key may be a group key used by the access point to encrypt packets sent to a group of devices. In one embodiment, the group key is a shared key for a plurality of devices connected to a wireless access point that is compatible with a wireless protocol (e.g., IEEE 802.11-2007 or other wireless standard).

The security logic 115 analyzes the packet based, at least in part, on the key type and the packet type to determine particular combinations of properties for a packet. This analysis includes determining if i) the key is a group key and ii) the packet is a unicast packet. In one embodiment, the security logic 115 logs and discards the packet on determining the key type is a group key and the packet is a unicast packet because (in one embodiment) this combination of properties is considered by the device 100 as a potential security risk (e.g., a malicious packet).

In another embodiment, when a packet is identified as a potential security risk, the security logic 115 logs the packet in a log file but does not discard the packet. Discarding the packet is desirable when the packet is sent from another wireless client device in the wireless network directly to the device 100. In a secured network, client devices should not communicate directly with each other by bypassing the access point. Two client devices communicating directly without using the access point is a condition that indicates a security risk. Accordingly, to maintain security in the network, the security logic 115 is configured to detect packets with this condition and discards these packets when the packets are encrypted with a group key.

In one embodiment, the security logic 115 analyzes the packet based, at least in part, on a layer 3 payload type of the packet in addition to the key type and the packet type to determine particular combinations of properties for a packet. This analysis includes determining if i) the key is a group key, ii) the packet is a layer 2 broadcast packet, and iii) the layer 3 payload type is unicast. In one embodiment, the security logic 115 logs and discards the packet on determining the packet matches these conditions because (in one embodiment) this combination of properties is considered by the device 100 as a potential security risk (e.g., a malicious packet).

In one embodiment, the security logic 115 checks a security header in the packet for a key identifier to determine the key type. The security header is, for example, part of a layer 2 data link layer header. The data link layer header is used by nodes within a network to facilitate local communications. The wireless devices in the network use the security header when communications on the network are secured. When a wireless access point provides secure communications, the wireless devices must authenticate with the access point before the wireless devices are permitted to participate in communicating on the network.

In one embodiment, the authentication includes having a wireless client device provide a preset password. The authentication may also include performing an authentication handshake that is compatible with the IEEE 802.11 standard.

Figure 2:
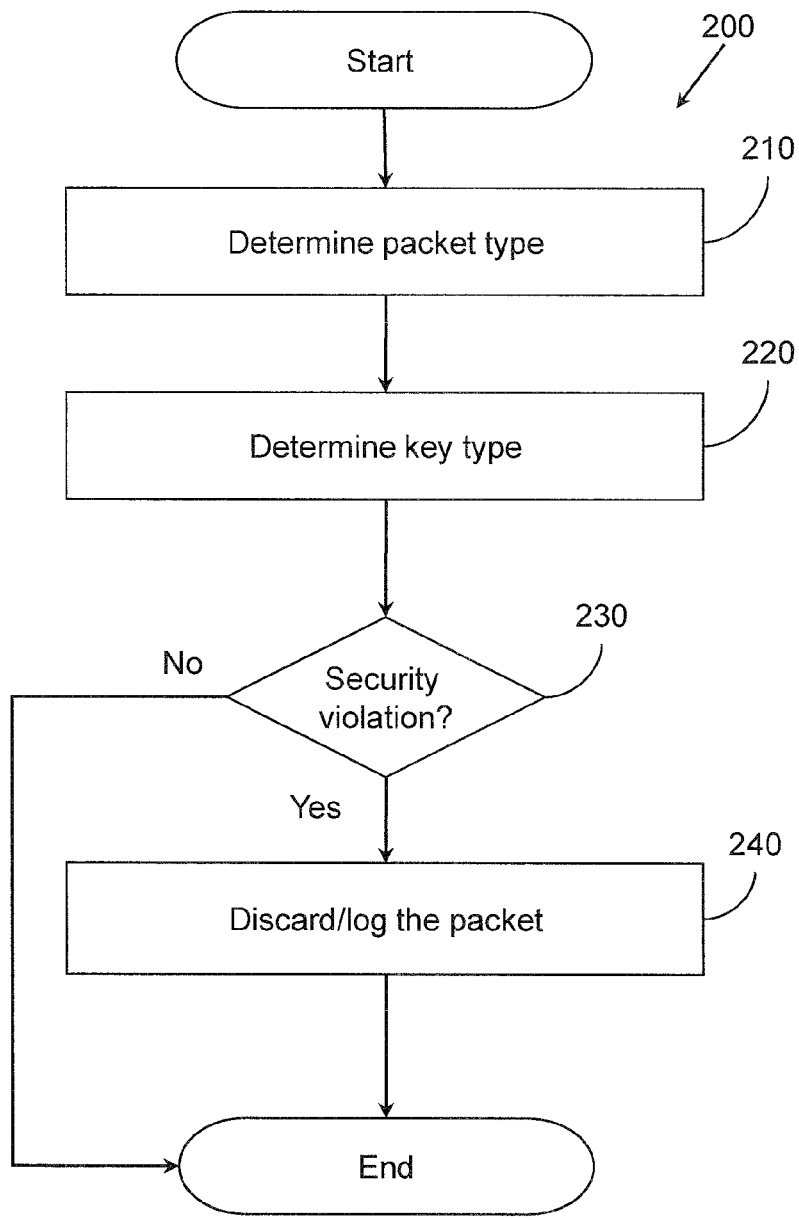
FIG. 2 illustrates one embodiment of a non-transitory computer readable medium associated with preventing misuse of a group cryptographic key in a wireless network.

FIG. 2 illustrates one embodiment of method 200 for detecting whether a received packet is a security violation or risk. In one embodiment, the method 200 is implemented in a non-transitory computer-readable medium that stores computer-executable instructions that when executed by a computer cause the computer to perform method 200.

At 210, a packet type of a received packet is determined. The packet type is how the packet is addressed (e.g. to a single device or a group of devices). In one embodiment, the packet type is broadcast, multicast, or unicast. As previously described, broadcast and multicast packets are packets that are sent to more than one device. Broadcast packets are sent to all members of a network using a specific broadcast address as the destination address. Members of a broadcast domain will receive the broadcast packets. A broadcast domain is a logical division of a computer network where all nodes can reach all other nodes through the use of a data link layer communication. The data link layer is layer 2 of the 7-layer Open Systems Interconnection (OSI) model of networking.

Multicast packets are sent to a subgroup of members in a network using a destination address associated with the subgroup. Both multicast and broadcast packets set the LSB in the first octet of the destination MAC address of the packet to "1". Thus, it is easily determinable whether a packet is a broadcast/multicast packet by inspecting this bit.

One example of a broadcast packet is an Address Resolution Protocol (ARP) packet. An access point broadcasts ARP packets to determine a layer 2 MAC address for a device when only a layer 3 Internet Protocol address is available.

Unicast packets are packets that are addressed to a single client device in the network. Unicast packets set the LSB in the first octet of the destination MAC address of the packet to "0". A device can determine if the packet is a unicast packet by checking this single bit.

In one embodiment, method 200 is performed by a wireless client device in a network that is compatible with the IEEE 802.11-2007 standard or other wireless protocol. The wireless client device will receive all wireless packets transmitted over the network whether or not the packets are intended/destined for the client device. However, only packets relevant to the device are processed. In one embodiment, the device determines whether packets are relevant by checking the destination address to determine whether the address is the address of the device or a multicast/broadcast address for a relevant group.

Continuing with method 200, at 220, after a packet is received, the method 200 determines a key type for the packet. In one embodiment, determining a key type is performed by determining whether a key used to encrypt the packet is a Pairwise Transient Key (PTK) or a Group Temporal Key (GTK). When a packet is encrypted, the packet includes a portion or payload that is obscured with the use of the key and an encryption algorithm. Obscuring the payload prevents clear text from being available over the wireless connection. This provides security against malicious users and devices that attempt to obtain information in the payload without consent. An access point uses a PTK to encrypt unicast packets for a client device. The access point uses a GTK to encrypt broadcast and multicast traffic. All devices associated with the access point share the same GTK.

Header information in the packet indicates the key and an algorithm used to encrypt the packet. In one embodiment, the packet includes a MAC header and a Counter Mode with Cipher Block Chaining Message Authentication Code Protocol (CCMP) header. The MAC header stores information about destination and source addresses as well as the format of the packet. The CCMP header includes information about how the packet is encrypted. In one embodiment, the packet is encrypted according to the Wi-Fi Protected Access (WPA) standard. In other embodiments, the packet is encrypted according to the WPA2 standard. In one embodiment, the encrypted payload includes a layer 3 header and data associated with the higher levels (e.g. layers 3-7) of the OSI model.

The key type may be determined by inspecting the CCMP header for a key type identifier. In other embodiments, the key type is determined by inspecting a source address and a key type identifier to determine a key associated with a source.

At 230, the method analyzes the packet based, at least in part, on the packet type and the key type to detect a security violation. In one embodiment, a security violation exists when the key type is a group key and the packet type is unicast for the packet. Typically, the access point is the only device that sends broadcast/multicast packets. Accordingly, the access point is also the only device that uses the group key to encrypt packets. Therefore, when a unicast packet encrypted with the group key is received from a device other than the access point, this condition is regarded as a potential security risk/violation.

The method proceeds to 240 in response to detecting the security violation. At 240, the method discards the packet and/or logs information associated with the packet in a log file. In another embodiment, the method includes logging the packet and then discarding the packet. In one example, a packet is discarded by deleting the packet from memory and not performing any additional processing of the packet after detecting the security violation.

Figure 3:
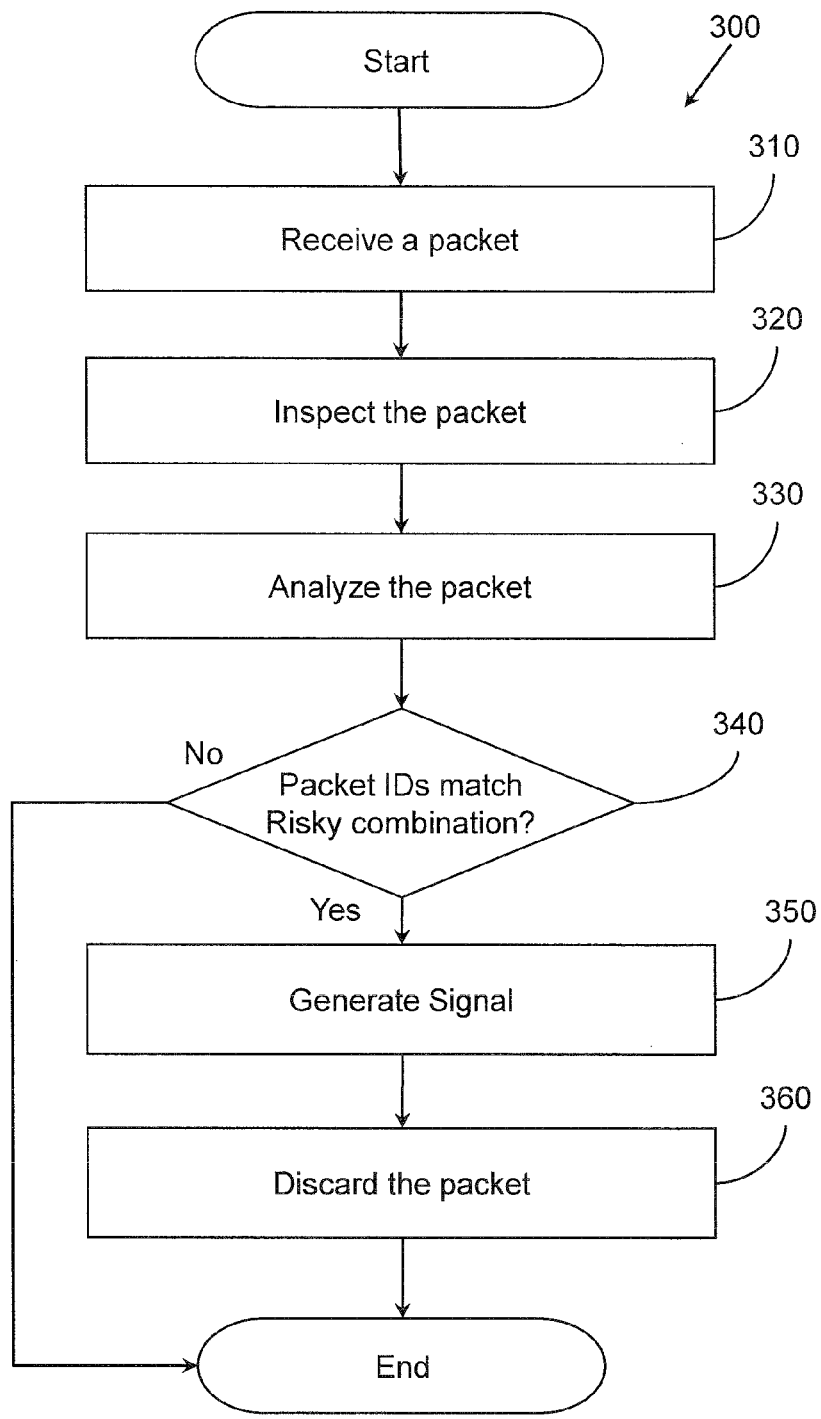
FIG. 3 illustrates one embodiment of a method associated with preventing misuse of a group cryptographic key in a wireless network.

FIG. 3 illustrates a method 300 associated with preventing misuse of a group cryptographic key in a wireless network. The method begins when, at 310, a client device receives a packet on a wireless connection. In one embodiment, the packet is transmitted and received on a wireless network connection (e.g. network that is compatible with IEEE 802.11-2007 standard).

At 320, the method proceeds by inspecting the packet to retrieve a packet type identifier and a key type identifier. In one embodiment, the client device inspects the packet by retrieving the packet type identifier and one or more key type identifiers from a header associated with the packet.

One example of inspecting the packet to retrieve the packet type identifier includes retrieving a bit in a destination MAC address of the packet (e.g., read the least significant bit LSB). This bit indicates whether the address is an individual address for a single client device or a group address for multiple client devices. In one embodiment, the LSB will be set to "0" to indicate an individually addressed packet.

Retrieving one or more key type identifiers may include retrieving a key ID from a CCMP header associated with the packet. In another embodiment, retrieving one or more key type identifiers includes retrieving a source address from a MAC header associated with the packet. The source address is, for example, an address of the device that sent the packet. The sending device is the device that directly transmitted the packet to the client device.

In other embodiments, retrieving one or more key type identifiers includes retrieving both the key ID and the source address. In one example, the source address is used to determine whether a Security Association (SA) exists for the sending device and the key ID is then used to determine a particular key from the SA. The security association may be a PTK-SA or a GTK-SA.

With continued reference to FIG. 3, after the packet is inspected to retrieve various identifiers, at 330, the packet type identifier and the key type identifier are analyzed based, at least in part, on a policy. In one embodiment, the policy is a wireless security policy that specifies certain combinations of key type identifiers and packet types that indicate a security risk or a security violation. At 340, the key type identifiers and packet type identifier from the packet are compared against the wireless security policy to determine if the packet IDs match any risky combination of values. If there is a match, the packet is regarded as suspicious and is flagged as a security risk/violation.

In an alternative embodiment, at 340, the packet type identifier, the key type identifier, and a layer 3 payload type of the packet are compared against the wireless security policy to determine if the packet matches a risky combination of values. In this case, the risky combination of values occurs when the packet type identifier is broadcast or multicast, the key type identifier is for a group key, and the layer 3 payload type indicates a unicast payload. In a different example, the packet type identifier may indicate a unicast packet, but the use of a group key with a layer 3 payload type that is a unicast payload indicates a risky combination.

The wireless security policy may be set to indicate the presence of one or more types of violations. In one embodiment, the wireless security policy may indicate an ARP poisoning attack, a Denial of Service (DoS) attack, and/or a malicious software installation. One example of a wireless security policy used to indicate these attacks is when a packet includes a packet type identifier that is unicast and key type identifier is for a group key.

An ARP poisoning attack occurs when a malicious ARP packet is received that improperly changes an association between a layer 3 IP address and a layer 2 MAC address. By changing a correlation between these two addresses, an ARP poisoning attack causes a poisoned device to send packets to a malicious device instead of an intended recipient. In this way, the ARP poisoning attack can facilitate a man-in-the-middle attack by misdirecting packets to a malicious gateway.

A DoS attack may occur by misusing a group key with a network management packet to change a current packet number for network broadcast messages to a larger number (e.g. the packet number is increased). Modifying the current packet number in this way causes valid packets to be discarded and therefore denies the service of these packets to the victim device. In this attack, valid packets are dropped because the packet number for a valid packet will be less than the reset number.

In other embodiments, misuse of the group key can occur by encrypting malicious software in a packet's payload. When a target device receives the malicious software in the payload it is unknowingly decrypted and processed. This processing and the negative effects that result can be avoided or at least reduced by using the wireless security policy to identify malicious packets.

If, at 340, the packet is determined to have a risky combination of IDs, then at 350, the method proceeds by generating a signal to indicate a security risk. In one embodiment, generating the signal may include initiating a security routine to process the risky packet in a designated manner. In another embodiment, generating the signal may include setting a flag in a buffer and/or interrupting a routine that is processing the packet.

At 360, in response to the signal, the packet is discarded. One example of discarding the packet includes deleting the packet from memory. In other embodiments, discarding the packet includes halting processing of the packet and deleting the packet from a buffer or cache. If at 340 the packet is not risky, then the packet is processed as normal. Method 300 then repeats for subsequent packets.

Figure 4:
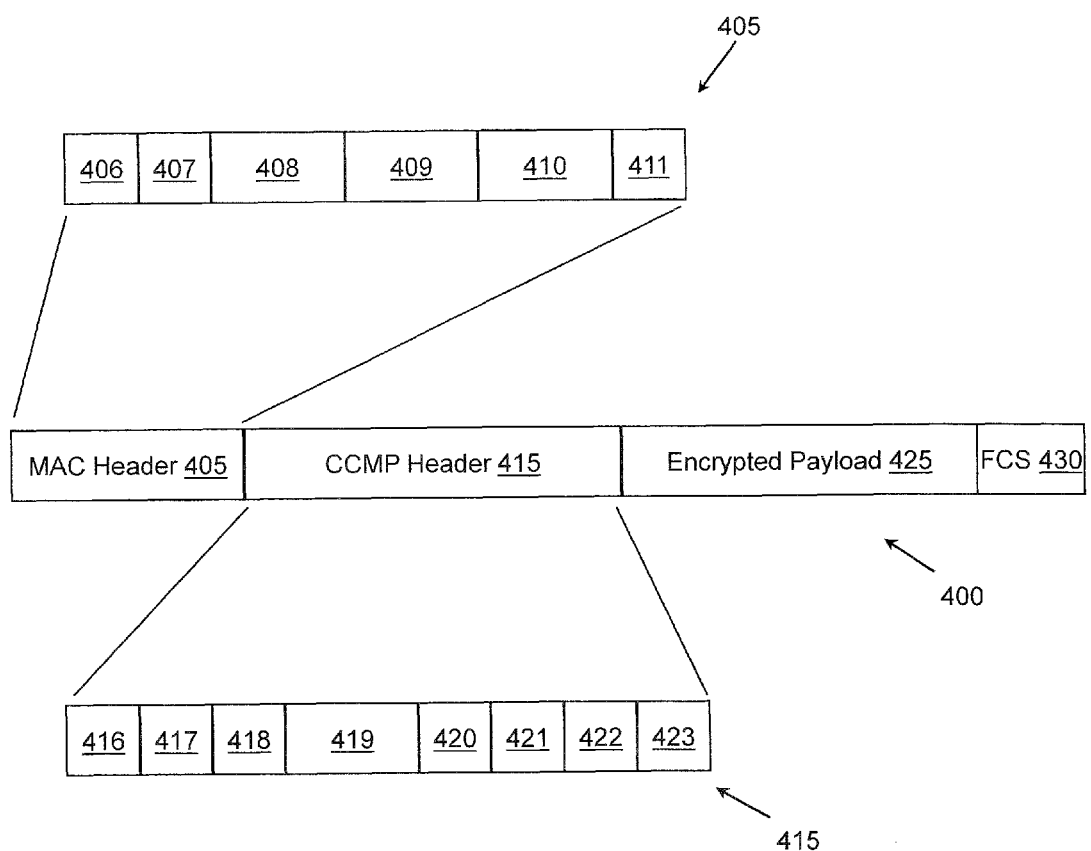
FIG. 4 illustrates an exemplary packet associated with a cryptographically protected wireless network communication.

FIG. 4 illustrates one embodiment of an exemplary packet 400 associated with a wireless network communication that is compatible with IEEE 802.11-2007. Of course, other protocols may have different packet configurations and thus the present systems and methods can be adjusted accordingly. The packet 400 includes a sequence of fields. In one example the sequence of fields include a MAC header 405, a CCMP header 415, an encrypted payload 425, and a Frame Check Sequence (FCS) field 430.

The MAC header 405 includes a series of subfields. The subfields of the MAC header 405 include information used to send the packet between nodes in a network. The MAC header 405 facilitates layer 2 communications between the nodes. In one example, the MAC header 405 includes a frame control field 406, a duration/ID field 407, address one 408, address two 409, address three 410, and a sequence control field 411. It should be understood that in other embodiments MAC header 405 may include more or less fields as appropriate for the implementation and as is compatible with the implemented standard (e.g., IEEE 802.11-2007 standard or other standard).

The frame control field 406 includes general information about the packet. This information may include a protocol version for the packet, a type and subtype field identifying a function of the packet, a To DS and a From DS field identifying a packet's origin, a protected frame field identifying the use of encryption with the packet, and so on. The duration/ID field 407 includes information about quality of service (QoS) and/or the duration of a packet frame depending on the type of packet. The sequence control field 411 indicates the number of the packet in a sequence of packets when more than one packet is used to send a data payload.

The address one field 408 includes a 48-bit destination MAC address. The address two field 409 includes a 48-bit MAC address of an AP that is sending the packet. The address three field 410 is a 48-bit MAC address of a device that initiated the packet. The address three field 410 indicates the original source of the packet. Address fields 408, 409, and 410 indicate layer 2 MAC addresses of devices involved in sending and receiving the packet. In one embodiment, a malicious user may spoof one or more of these addresses by substituting a different MAC address other than a MAC address of a device that actually sent the packet.

In one embodiment, a security policy indicates a packet with a spoofed address by denoting a combination of one or more fields in addition to the address fields. Inspecting these additional fields facilitates identifying a packet type of a spoofed packet. In other embodiments, different combinations of MAC header 405 fields may be specified by the security policy to identify a source of the packet and/or a key type used to encrypt the packet. Additionally, in other embodiments, the MAC header 405 fields may be used in combination with CCMP header 415 fields to determine a key type and/or a source of the packet.

The CCMP header 415 indicates information used to perform cryptographic functions on the packet. The CCMP header 415 includes a 48-bit packet number divided between six packet number fields 416, 417, 420, 421, 422, and 423. The packet number is one element used as an input to a cryptographic algorithm that encrypts the packet payload 425. The CCMP header 415 also includes a reserved field 418 and a key ID field 419. The key ID field 419 identifies a key number for a key that encrypts the packet.

In one embodiment, the key ID field 419 is used in combination with a source address and/or AP address to identify a key that encrypts the packet payload 425. For example, an encrypting key may be determined by first checking whether a source address is associated with a PTK-SA. If a PTK-SA exists then the key ID denotes which PTK-SA encrypts the packet payload 425. If no PTK-SA exists then the default is the GTK-SA and the key ID identifies which group key encrypts the packet payload 425. In this way, the PTK is bound to a source/AP address while the GTK is not.

It should be understood that in other embodiments the CCMP header 415 may include more or less fields as appropriate for the implementation and as is compatible with the IEEE 802.11-2007 standard or other implemented standard.

Continuing with the packet 400, the encrypted payload 425 is the portion of the packet 400 that is encrypted according to information in the MAC header 405 and the CCMP header 415. Encrypted payload 425 includes, for example, higher layer header information (e.g. layer-3 header information, layer-4 header information, etc.) and any data associated with the packet's use.

FCS 430 includes an error checking segment to ensure the packet 400 does not include any errors. In one embodiment, the FCS 430 includes a cyclic redundancy check (CRC) value for the packet 400.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes hardware, firmware, instructions stored on a non-transitory computer-readable medium or in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, such examples should not restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer-executable instructions for determining whether an encrypted packet received by a wireless device corresponds to a security risk, the computer-executable instructions being executable by a computer to cause the computer to:
   determine, in the wireless device, a type of the encrypted packet;
   determine a type of key used to encrypt the encrypted packet; and
   detect whether the encrypted packet corresponds to the security risk based, at least in part, on i) the type of the encrypted packet and ii) the type of key used to encrypt the encrypted packet,
   wherein the wireless device and a neighbor device are wireless client devices of a wireless access point, and wherein the security risk is associated with the neighbor device transmitting the encrypted packet directly to the wireless device.

2. The non-transitory computer-readable medium of claim 1, further comprising instructions to cause the computer to:
   in response to detecting that the encrypted packet corresponds to the security risk, discard the encrypted packet or logging the encrypted packet in a log file.

3. The non-transitory computer-readable medium of claim 1, wherein the computer-executable instructions executable by the computer to cause the computer to determine the type of the encrypted packet comprises:
   computer-executable instructions to cause the computer to determine whether the encrypted packet is addressed to i) a single client or ii) a group of clients.

4. The non-transitory computer-readable medium of claim 1, wherein the computer-executable instructions executable by the computer to cause the computer to determine the type of key used to encrypt the encrypted packet comprises:
   computer-executable instruction to cause the computer to determine whether the type of key used to encrypt the encrypted packet i) a Pairwise Transient Key (PTK) or ii) a Group Temporal Key (GTK).

5. The non-transitory computer-readable medium of claim 1, wherein the computer-executable instructions executable by the computer to cause the computer to detect whether the encrypted packet corresponds to the security risk comprises:
   computer-executable instructions executable by the computer to detect that the encrypted packet corresponds to the security risk in response to:
     i) the type of key used to encrypt the encrypted packet being a group key, and
     ii) the type of the encrypted packet being a unicast packet addressed only to the wireless device.

6. The non-transitory computer-readable medium of claim 1, wherein the encrypted packet is a wireless packet received by the wireless device in a network that is compatible with IEEE 802.11.

7. The non-transitory computer-readable medium of claim 1, wherein the encrypted packet includes a portion that is encrypted according to Wi-Fi Protected Access (WPA) or WPA2, and wherein the encrypted packet is an Address Resolution Protocol (ARP) packet.

8. A method, comprising:
   inspecting, by a client device, a packet received on a wireless connection in the client device to retrieve a packet type identifier of the packet and a key type identifier for a key used to encrypt the packet;
   analyzing, by the client device, the packet type identifier of the packet and the key type identifier based, at least in part, on a policy; and generating, by the client device, a signal in response to determining that the packet type identifier and the key type identifier match a condition of the policy that indicates a security risk, wherein the client device and a neighbor device are wireless client devices of a wireless access point, and wherein the security risk is associated with the neighbor device transmitting the packet directly to the wireless device.

9. The method of claim 8, further comprising:
discarding the packet in response to generating the signal.

10. The method of claim 8, wherein the policy is a wireless security policy for identifying malicious packets and wherein the signal is generated to indicate the security risk specified by the condition in the policy when the packet type identifier from the packet is unicast and the key type identifier from the packet is for a group key.

11. The method of claim 8, wherein the packet type identifier indicates a layer 2 address type in the packet, wherein inspecting the packet further includes determining a layer 3 payload type of the packet, and wherein the signal is generated when the layer 3 payload type is unicast, the packet type identifier is broadcast and the key type identifier is for a group key.

12. The method of claim 8, wherein the packet type identifier indicates a layer 2 address type in the packet, wherein inspecting the packet further includes determining a layer 3 payload type of the packet, and wherein the signal is generated when the layer 3 payload type is unicast, the packet type identifier is unicast and the key type identifier is for a group key.

13. The method of claim 8, wherein inspecting the packet to retrieve the key type identifier includes retrieving at least one key type identifier from the packet.

14. The method of claim 8, wherein the policy is a wireless security policy and wherein the signal indicates a violation of the wireless security policy, the violation being an ARP poisoning attack, a Denial of Service (DoS) attack, or a malicious software installation.

15. A device comprising:
a wireless receiver configured to receive wireless communications, wherein the wireless communications include encrypted packets;
address logic configured to inspect at least one encrypted packet from the received encrypted packets for a packet type by determining whether the encrypted packet is addressed to an individual device or a group of devices; and
security logic configured to determine a type of key used to encrypt the encrypted packet and configured to detect whether the encrypted packet corresponds to a security risk based, at least in part, on the key type and the packet type,
wherein the device and a neighbor device are wireless client devices of a wireless access point, and wherein the security risk is associated with the neighbor device transmitting the encrypted packet directly to the device.

16. The device of claim 15, wherein the security logic is further configured to log and discard the encrypted packet upon determining the key type is a group key and the packet is addressed to the device and not to a group of devices.

17. The device of claim 16, wherein the device is a wireless client device of the wireless access point and wherein the encrypted packet is received directly from the neighbor device of the wireless access point.

18. The device of claim 16, wherein the group key is a shared key for a plurality of devices connected to the wireless access point that is compatible with IEEE 802.11.

19. The device of claim 15, wherein the address logic determines whether the encrypted packet is addressed to an individual device or a group of devices by determining whether a destination MAC address is a broadcast address, a multicast address, or a unicast address.

20. The device of claim 15, wherein the security logic is further configured to determine whether the encrypted packet corresponds to a security risk based, at least in part, on the key type, the packet type, and a layer 3 payload type of the encrypted packet.

\* \* \* \* \*